(12) United States Patent
Thienphrapa

(10) Patent No.: US 10,800,476 B1
(45) Date of Patent: Oct. 13, 2020

(54) MOTORIZED CYCLE

(71) Applicant: John Suratana Thienphrapa, Los Angeles, CA (US)

(72) Inventor: John Suratana Thienphrapa, Los Angeles, CA (US)

( * ) Notice: Subject to any disclaimer, the term of this patent is extended or adjusted under 35 U.S.C. 154(b) by 70 days.

(21) Appl. No.: 16/202,357

(22) Filed: Nov. 28, 2018

Related U.S. Application Data

(60) Provisional application No. 62/599,759, filed on Dec. 17, 2017.

(51) Int. Cl.
| | |
|---|---|
| *B62K 5/027* | (2013.01) |
| *B62K 5/06* | (2006.01) |
| *B62J 1/12* | (2006.01) |
| *B62K 25/04* | (2006.01) |
| *B62L 3/02* | (2006.01) |
| *B62K 23/02* | (2006.01) |
| *B62K 15/00* | (2006.01) |
| *B62L 1/00* | (2006.01) |

(52) U.S. Cl.
CPC ............ *B62K 5/027* (2013.01); *B62J 1/12* (2013.01); *B62K 5/06* (2013.01); *B62K 15/00* (2013.01); *B62K 15/006* (2013.01); *B62K 23/02* (2013.01); *B62K 25/04* (2013.01); *B62L 3/02* (2013.01); *B62K 2204/00* (2013.01); *B62L 1/00* (2013.01)

(58) Field of Classification Search
CPC ...... B62K 5/027; B62K 15/00; B62K 15/006; B62K 23/02; B62K 25/04; B62K 5/06; B62K 2204/00; B62L 3/02; B62L 1/00; B62J 1/12
See application file for complete search history.

(56) References Cited

U.S. PATENT DOCUMENTS

| | | | | |
|---|---|---|---|---|
| 1,120,427 A | | 12/1914 | Webster | |
| 2,861,815 A | * | 11/1958 | Willinger | B62K 15/00 280/278 |
| 2,965,186 A | | 12/1960 | Burns, Jr. | |
| 3,004,619 A | * | 10/1961 | Straussler | B60F 5/003 180/208 |
| 3,417,834 A | * | 12/1968 | Smith | B62K 11/06 180/208 |

(Continued)

FOREIGN PATENT DOCUMENTS

| | | | | | |
|---|---|---|---|---|---|
| JP | 2005145416 A | * | 6/2005 | | |
| JP | 2017140916 A | * | 8/2017 | ........... | A61G 5/1059 |

*Primary Examiner* — Drew J Brown
(74) *Attorney, Agent, or Firm* — Quickpatents, LLC; Kevin Prince

(57) ABSTRACT

A vehicle for a person to ride on a ground surface includes a frame that has a front end and a rear end. The frame supports a seat on a top side of the frame and a steering mechanism proximate the front end of the frame for allowing the person to steer a front wheel. A frame extension has a front end pivotally fixed proximate the rear end of the frame and includes two rear wheels projecting laterally away therefrom. At least one of the rear wheels is coupled with a motor through a transmission to drive the vehicle. In use, the frame extension and rear wheels are pivoted forward to place the vehicle in a collapsed configuration for storage. To use the vehicle, the frame extension is pivoted backward to place the vehicle in an operating configuration. Preferably the motor and transmission are disposed between the two rear wheels.

18 Claims, 6 Drawing Sheets

(56) References Cited

U.S. PATENT DOCUMENTS

| | | | |
|---|---|---|---|
| 3,776,353 A | 12/1973 | Roth | |
| 4,392,536 A | 7/1983 | Iwai | |
| 4,437,535 A | 3/1984 | Winchell | |
| 4,460,057 A | 7/1984 | Kohyama | |
| RE32,031 E | 11/1985 | Winchell | |
| 4,558,878 A | 12/1985 | Motrenec | |
| 5,425,567 A * | 6/1995 | Albecker, III | A47C 1/146 297/377 |
| 5,611,555 A | 3/1997 | Vidal | |
| 6,021,862 A | 2/2000 | Sharan | |
| 6,345,678 B1 * | 2/2002 | Chang | B62K 3/002 180/181 |
| 7,100,727 B2 | 9/2006 | Patin | |
| 7,419,024 B1 | 9/2008 | Tavantzis | |
| 7,600,596 B2 | 10/2009 | Van Den Brink | |
| 8,056,658 B2 | 11/2011 | Horii | |
| 8,177,012 B2 | 5/2012 | Horii | |
| 8,249,775 B2 | 8/2012 | Van Den Brink | |
| 8,531,072 B2 | 9/2013 | Wishart | |
| 8,641,064 B2 | 2/2014 | Krajekian | |
| 8,862,296 B2 | 10/2014 | Kurakawa | |
| 8,915,323 B2 | 12/2014 | Tsujii | |
| 9,731,785 B1 | 8/2017 | Liu | |
| 9,764,657 B2 | 9/2017 | Harding | |
| 9,862,448 B2 | 1/2018 | Hirakawa | |
| 10,562,583 B1 * | 2/2020 | Chan | B62K 15/006 |
| 2004/0035628 A1 | 2/2004 | Takayanagi | |
| 2004/0129472 A1 * | 7/2004 | Cheng | B62K 3/002 180/181 |
| 2005/0151345 A1 * | 7/2005 | Chen | B62K 15/006 280/287 |
| 2006/0249322 A1 | 11/2006 | Maki | |
| 2007/0051548 A1 | 3/2007 | Kosco | |
| 2008/0115994 A1 | 5/2008 | Martini | |
| 2008/0135319 A1 | 6/2008 | Lynn | |
| 2008/0296855 A1 * | 12/2008 | Roseman | B62B 3/027 280/33.993 |
| 2010/0292041 A1 | 11/2010 | Matthies | |
| 2012/0013103 A1 * | 1/2012 | Marion | B62K 11/10 280/639 |
| 2012/0175856 A1 | 7/2012 | Ellis | |
| 2013/0062863 A1 * | 3/2013 | Moldestad | B62K 15/00 280/639 |
| 2013/0153311 A1 | 6/2013 | Huntzinger | |
| 2013/0288841 A1 * | 10/2013 | Yoshino | B60K 7/0007 475/149 |
| 2013/0304319 A1 | 11/2013 | Daniels | |
| 2014/0077476 A1 | 3/2014 | Kosco | |
| 2015/0021985 A1 * | 1/2015 | Matsuda | B60L 50/51 307/10.1 |
| 2016/0096574 A1 | 4/2016 | Liu | |
| 2016/0221629 A1 * | 8/2016 | Behar | B62K 15/006 |
| 2016/0355229 A1 | 12/2016 | Chen | |
| 2017/0021889 A1 | 1/2017 | Frohnmayer | |
| 2017/0050693 A1 | 2/2017 | Mathes | |
| 2017/0101145 A1 | 4/2017 | Martinez | |
| 2017/0158277 A1 | 6/2017 | Hsu | |
| 2017/0247075 A1 * | 8/2017 | Kano | B62K 13/08 |

* cited by examiner

MOTORIZED CYCLE

CROSS-REFERENCE TO RELATED APPLICATIONS

This application claims the benefit of U.S. Provisional Patent Application 62/599,759, filed on Dec. 17, 2017, and incorporated herein by reference.

STATEMENT REGARDING FEDERALLY SPONSORED RESEARCH AND DEVELOPMENT

Not Applicable.

FIELD OF THE INVENTION

This invention relates to vehicles, and more particularly to a motorized cycle having three wheels.

DISCUSSION OF RELATED ART

Motorcycle riding, generally, is popular with young adult males, whereas teens, women, and older people do not share enthusiasm for riding two-wheeled motorcycles mainly because of vehicle instability. Accordingly it is a common practice for motorcycles to be fitted with a wider rear wheel for added stability. Adding a third wheel to such a cycle results in a so-called "trike" or tricycle-type vehicle, which are much more stable but nearly as clumsy as automobiles in that such trikes and tricycle-type vehicles do not have a slim body and the agility of motorcycles to navigate in tight places, between cars in city traffic where allowed, nor to negotiate tight turns well.

Therefore, there is a need for a vehicle that combines the stability of a trike or tricycle-type vehicle with the maneuverability of a motorcycle. Such a needed invention would provide a collapsed configuration for facilitating storage and transport of the vehicle. Further, such a needed vehicle would be comfortable to ride and easy to use. The present invention accomplishes these objectives.

SUMMARY OF THE INVENTION

The present device is a vehicle for a person to ride on a ground surface. The vehicle includes a rigid frame that has a front end and a rear end. The frame supports at least a seat on a top side of the frame proximate the rear end of the frame.

A steering mechanism is disposed proximate the front end of the frame and is adapted for allowing the person to steer a front wheel that is rotationally fixed to the frame. Such a steering mechanism may include rigid handlebars fixed with a rigid steering fork that straddles the front wheel through a steering headstock fixed with the front end of the frame. Preferably the steering mechanism further includes hand grips at opposing ends of the handlebars.

A rigid frame extension has a front end that is pivotally fixed proximate the rear end of the frame. The frame extension includes two rear wheels projecting laterally away from a rear end of the frame extension. At least one of the rear wheels is coupled with at least one motor through a transmission, the motor electrically connected with at least one battery that is disposed on the vehicle, preferably on a bottom side of the frame.

To inhibit theft of the vehicle, an on/off switch with a key lock is preferably included to electrically activate the motor only if a key is inserted into the key lock of the on/off switch. A throttle switch is fixed with the steering mechanism, and preferably the handlebars proximate one of the hand grips, and is used by the person to control the speed of the motor and thereby the speed of the vehicle. Preferably the frame extension is generally U-shaped and includes two opposing ends, each end being fixed to the frame with one of two pivots.

The transmission may be a reduction gear arrangement with essentially a single speed or gear ratio, or an automatic transmission that shifts to different gear ratios depending on the speed of the vehicle and the demand for acceleration from the throttle switch, such automatic transmissions being known in the art.

In use, the frame extension and rear wheels are pivoted forward to place the vehicle in a collapsed configuration for storage or to facilitate transport of the vehicle, for example. To use the vehicle, the frame extension is pivoted backward to place the vehicle in an operating configuration.

Preferably the frame includes a rear cross member adapted to contact the extension frame when the vehicle is in the operating configuration. The vehicle further includes a resilient suspension member fixed between the rear cross member and the extension frame for cushioning the frame from impacts to the rear wheels, for example.

The vehicle preferably further includes a front brake mechanism fixed between the front wheel and the steering fork, the front brake mechanism preferably further including a front actuator cable extending upward from the front brake mechanism along the steering fork, to the handlebars, and to one of the hand grips to a front brake actuator lever. Similarly, a rear brake mechanism may be included, fixed between at least one of the rear wheels and the extension frame. Such a rear brake mechanism preferably includes a rear actuator cable extending forward from the rear brake mechanism along the frame to the steering headstock, to the handlebars, and then to one of the hand grips to a rear brake actuator lever. As such, actuation of the rear brake actuator lever moves the rear actuator cable to actuate the rear brake mechanism to slow or stop the at least one of the rear wheels from rotating with respect to the frame extension.

Preferably the motor and transmission are disposed between the two rear wheels of the frame extension. In some embodiments the motor is a hub motor fixed within each wheel, and may also include a hub motor in the front wheel. That is, the motor may include three hub motors, one in each wheel.

The present invention is a vehicle that combines the stability of a trike or tricycle-type vehicle with the maneuverability of a motorcycle. The present device provides for a collapsed configuration for facilitating storage and transport of the vehicle, and is comfortable to ride and easy to use. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
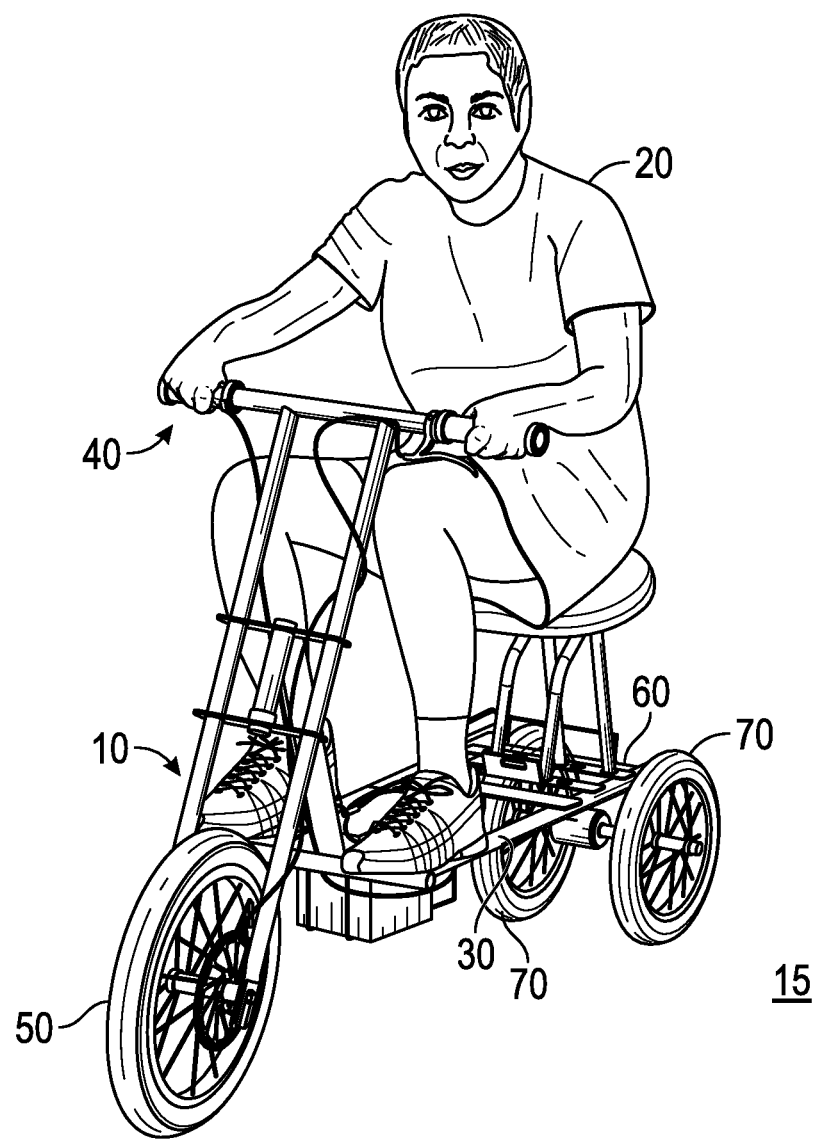
FIG. 1 is a perspective view of the invention, illustrated as in-use by a person riding on a ground surface.
Figure 2:
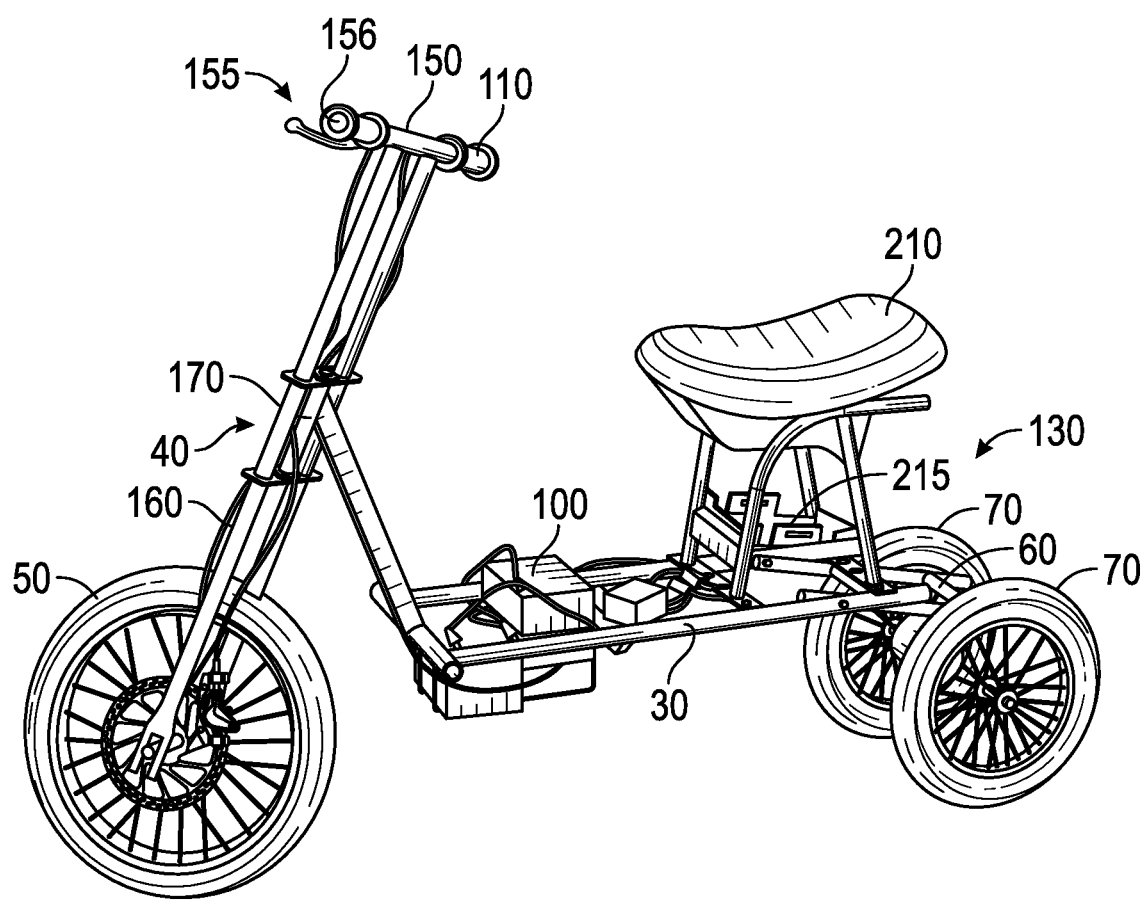
FIG. 2 is a perspective view of the invention, illustrated in an operating configuration.
Figure 3:
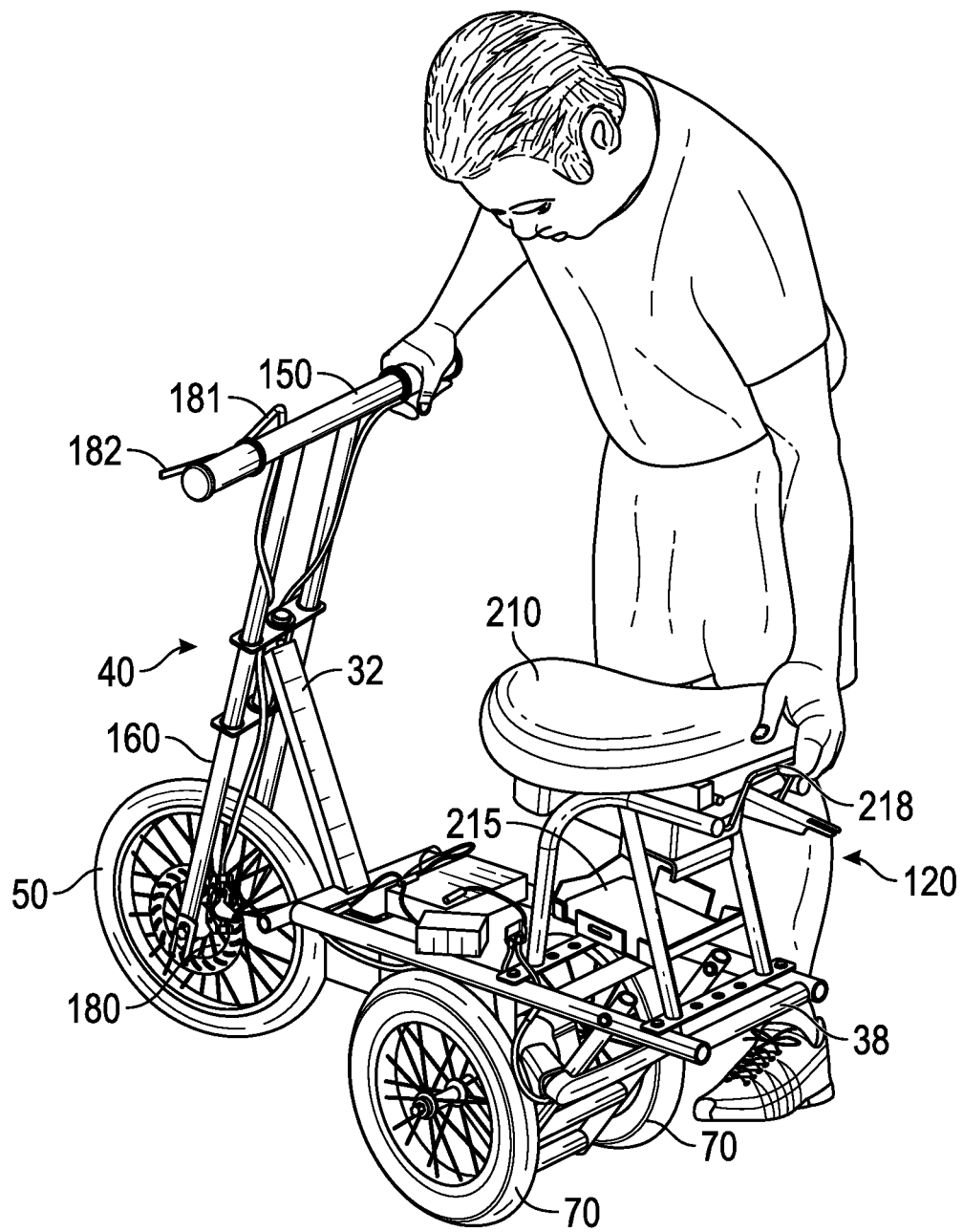
FIG. 3 is a perspective view of the invention, illustrated in a collapsed configuration.
Figure 4:
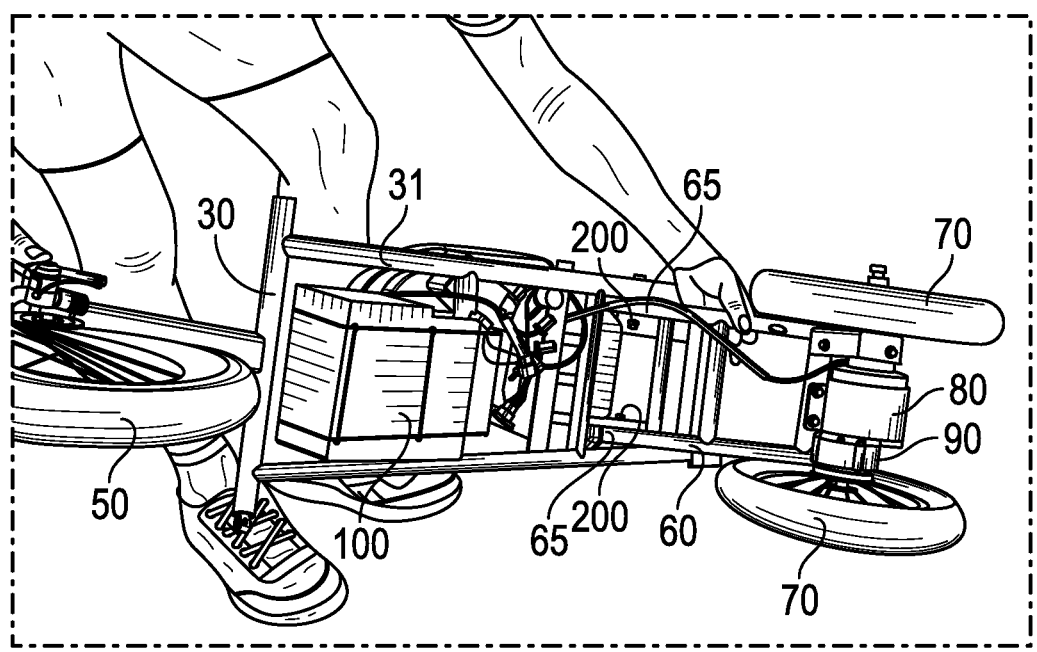
FIG. 4 is a bottom perspective view showing a frame extension with an electric motor powering one of two rear wheels projecting laterally away from the frame extension.

FIGS. 1-3 illustrate a vehicle 10 for a person 20 to ride on a ground surface 15. The vehicle 10 includes a rigid frame 30 that has a front end 32 and a rear end 38. The frame 30 supports at least a seat 210 on a top side 39 of the frame 30 proximate the rear end 38 of the frame 30. The seat 210 preferably includes a seat cushion and a seat frame, with a storage space 215 under the seat cushion for allowing the storing of a helmet (not shown), shopping bag (not shown), or the like.

A steering mechanism 40 is disposed proximate the front end 32 of the frame 30 (FIG. 2). The steering mechanism 40 is adapted for allowing the person 20 to steer a front wheel 50 that is rotationally fixed to the frame 30. Such a steering mechanism 40 may include rigid handlebars 150 fixed with a rigid steering fork 160 that straddles the front wheel 50 through a steering headstock 170 fixed with the front end 32 of the frame 30. Preferably the steering mechanism 40 further includes hand grips 156 at opposing ends 155 of the handlebars 150.

A rigid frame extension 60 has a front end 62 that is pivotally fixed proximate the rear end 38 of the frame 30. The frame extension 60 includes two rear wheels 70 projecting laterally away from a rear end 68 of the frame extension 60. At least one of the rear wheels 70 is coupled with a motor 80 through a transmission 90, the motor 80 electrically connected with at least one battery 100 that is disposed on the vehicle 10, preferably on a bottom side 31 of the frame 30 between the front end 32 and the seat 210.

Figure 5:
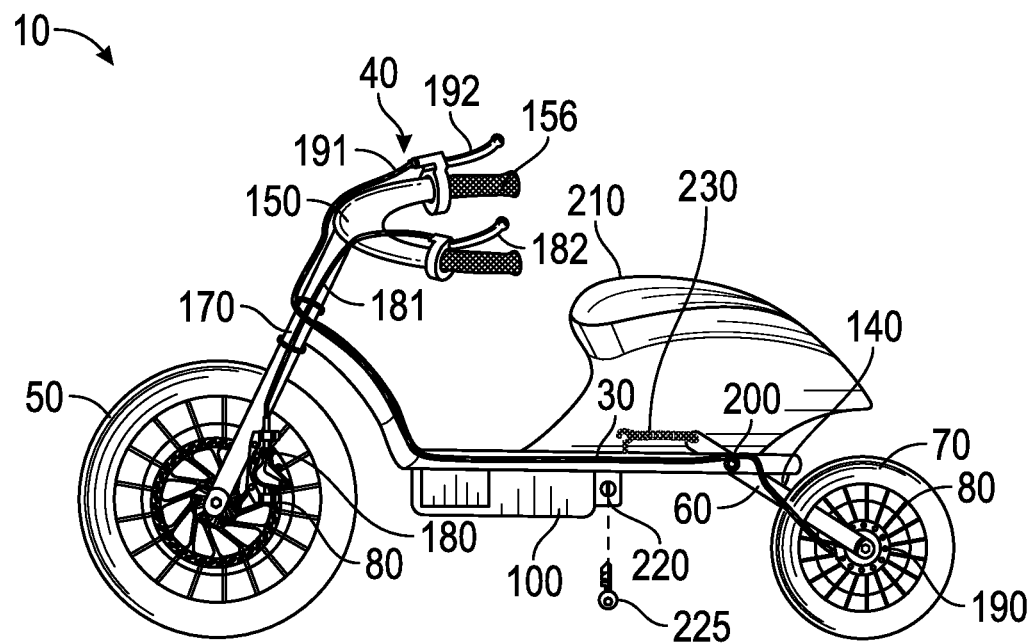
FIG. 5 is a side elevational diagram of another embodiment of the invention.
Figure 6:
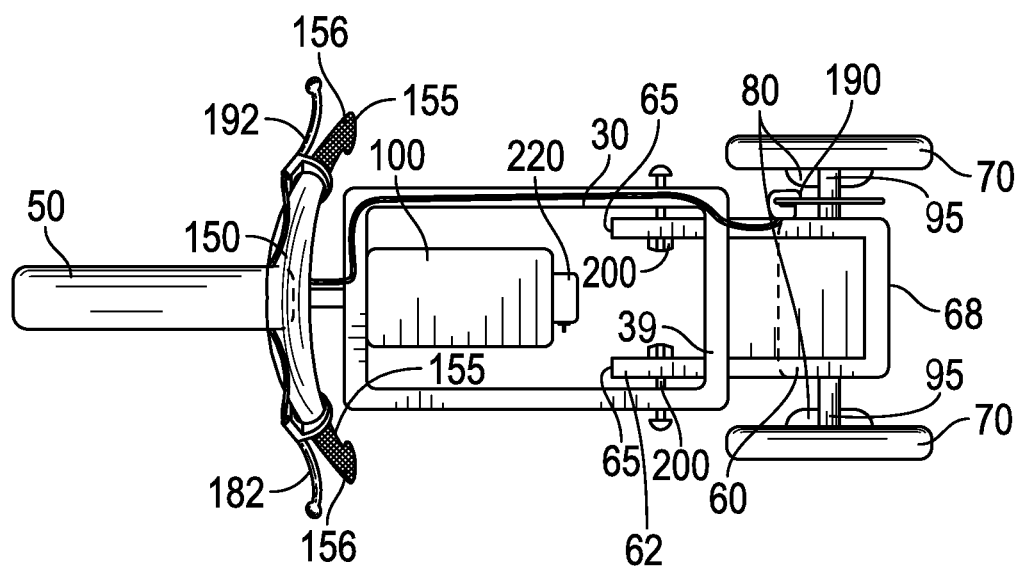
FIG. 6 is a top plan view of the invention, illustrated with the seat omitted for clarity of illustration.

To inhibit theft of the vehicle 10, an on/off switch 220 with a key lock is preferably included to electrically activate the motor 80 only if a key 225 is inserted into the key lock of the on/off switch 220. A throttle switch 110 is fixed with the steering mechanism 40, and preferably the handlebars 150 proximate one of the hand grips 156, and is used by the person 20 to control the speed of the motor 80 and thereby the speed of the vehicle 10. Preferably the frame extension 60 is generally U-shaped and includes two opposing ends 65, each end 65 being fixed to the frame 30 with one of two pivots 200 (FIGS. 5 and 6).

The transmission 90 may be a reduction gear arrangement with essentially a single speed or gear ratio, or an automatic transmission that shifts to different gear ratios depending on the speed of the vehicle 10 and the demand for acceleration from the throttle switch 110, such automatic transmissions being known in the art. A gear control lever and actuator (not shown) may be included proximate the steering mechanism 40 to allow the person 20 to change gear ratios of the transmission 90 manually, as is also known in the art. The transmission 90 drives either one or both of the rear wheels 70 through a rotating drive shaft 95 (FIG. 6).

In use, the frame extension 60 and rear wheels 70 are pivoted forward to place the vehicle 10 in a collapsed configuration 120 (FIG. 3) for storage or to facilitate transport of the vehicle 10, for example. To use the vehicle 10, the frame extension 60 is pivoted backward to place the vehicle 10 in an operating configuration 130 (FIGS. 1 and 2). The seat 210 preferably includes a handle 218 (FIG. 3) projecting rearwardly therefrom, such that the handle 218 may be grasp and lifted to collapsed the frame extension into the retracted configuration 120. A safety chain 230 (FIG. 5) is preferably selectively installed between the frame extension 60 and the frame 30 (or seat 210) to inhibit the frame extension 60 from inadvertently being retracted into the collapsed configuration 120.

Figure 7A:
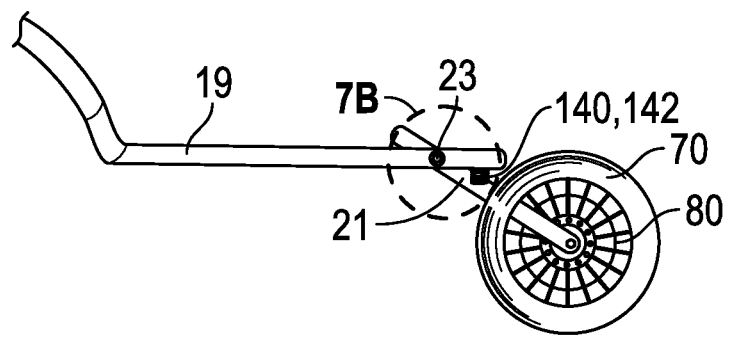
FIG. 7A is a partial side elevational view of the invention, illustrating a resilient suspension member fixed between the frame extension and a frame of the invention.
Figure 7B:
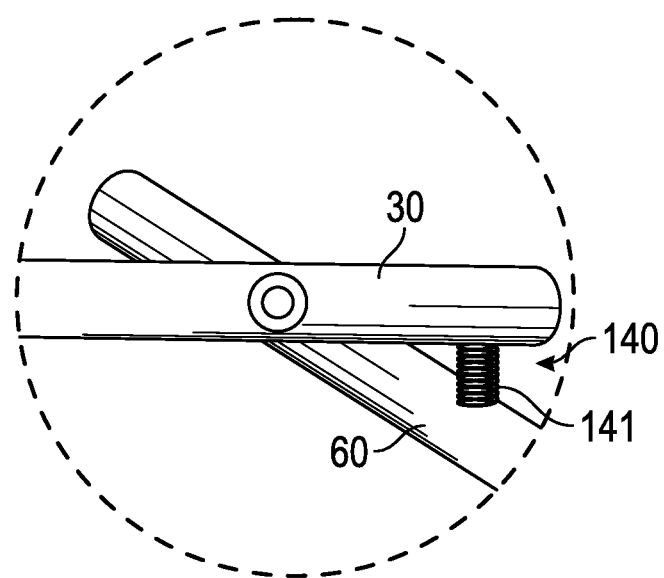
FIG. 7B is a partial side elevational view of an alternate embodiment of the resilient suspension member.

Preferably the frame 30 includes a rear cross member 39 (FIG. 6) adapted to contact the extension frame 60 when the vehicle 10 is in the operating configuration 130. The vehicle 10 further includes a resilient suspension member 140, such as at least one spring shock absorber 141 (FIG. 7B) or at least one elastomeric cushion 142 (FIG. 7A) fixed between the rear cross member 39 and the extension frame 60 for cushioning the frame 30 from impacts to the rear wheels 70, for example.

The vehicle 10 preferably further includes a front brake mechanism 180 fixed between the front wheel 50 and the steering fork 160, the front brake mechanism preferably further including a front actuator cable 181 extending upward from the front brake mechanism 180 along the steering fork 160, to the handlebars 150, and to one of the hand grips 156 to a front brake actuator lever 182 (FIGS. 5 and 6).

Similarly, a rear brake mechanism 190 may be included, fixed between at least one of the rear wheels 70 and the extension frame 60. Such a rear brake mechanism 190 preferably includes a rear actuator cable 191 extending forward from the rear brake mechanism 190 along the frame 30 to the steering headstock 170, to the handlebars 150, and then to one of the hand grips 156 to a rear brake actuator lever 192. As such, actuation of the rear brake actuator lever 192 moves the rear actuator cable 191 to actuate the rear brake mechanism 190 to slow or stop the at least one of the rear wheels 70 from rotating with respect to the frame extension 60.

Preferably the motor 80 and transmission 90 are disposed between the two rear wheels 70 of the frame extension 60. In some embodiments the motor 80 is a hub motor fixed within each wheel 70 (FIGS. 5 and 6), and may also include a hub motor 80 in the front wheel 50. That is, the motor 80 may include three hub motors 80, one in each wheel 50,70. In an alternate embodiment of the invention, the motor 80 is a gasoline-powered engine (not shown), or an engine fueled by a different type of fuel (not shown) than gasoline. Such engines are known in the art or may become known in the art and be suitable for powering the vehicle 10, provided the motor 80 is adapted for use when the vehicle is in the operating configuration 130 and does not become dislodged from a chain or other linkage when the vehicle is placed in the collapsed configuration 120.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A vehicle for a person to ride on a ground surface, comprising:
   a frame having a front end and a rear end, the frame supporting at least a seat on a top side thereof proximate the rear end of the frame, and a steering mechanism proximate the front end of the frame, the steering mechanism adapted for steering a front wheel rotationally fixed thereto;
   a front end of a frame extension pivotally fixed proximate the rear end of the frame, the frame extension further including two rear wheels projecting laterally away from a rear end of the frame extension, at least one of the rear wheel coupled with a motor through a transmission, the motor electrically connected with at least one battery disposed on the vehicle and a throttle switch fixed with the steering mechanism;
   the frame including a rear cross member adapted to contact the extension frame when the extension frame is in the operating configuration, the vehicle further including a resilient suspension member fixed between the rear cross member and the extension frame for cushioning the frame from impacts to the rear wheels;
   whereby the frame extension and rear wheels can be pivoted forward to place the vehicle in a collapsed configuration, or pivoted backward to place the vehicle in an operating configuration.

2. The vehicle of claim 1 wherein the motor and transmission are disposed between the two rear wheels on the frame extension.

3. The vehicle of claim 2 wherein the transmission drives one of the rear wheels through a rotating drive shaft.

4. The vehicle of claim 2 wherein the transmission drives both rear wheels through a rotating drive shaft.

5. The vehicle of claim 1 wherein the steering mechanism includes handlebars fixed with a steering fork that straddles the front wheel through a steering headstock fixed with the front end of the frame, the throttle fixed on the handlebars.

6. The vehicle of claim 5 wherein the frame further includes hand grips at opposing ends of the handlebars, the throttle incorporated within one of the hand grips.

7. The vehicle of claim 6 further including a front brake mechanism fixed between the front wheel and the steering fork, the front brake mechanism including a front actuator cable extending upward from the front brake mechanism along the steering fork, to the handlebars, and to one of the hand grips to a front brake actuator lever, whereby actuation of the front brake actuator level moves the front actuator cable to actuate the front brake mechanism to slow or stop the front wheel from rotating with respect to the front steering fork.

8. The vehicle of claim 6 further including a rear brake mechanism fixed between at least one of the rear wheels and the extension frame, the rear brake mechanism including a rear actuator cable extending forward from the rear brake mechanism along the frame, to the steering headstock, to the handlebars, and then to one of the hand grips to a rear brake actuator lever, whereby actuation of the rear brake actuator level moves the rear actuator cable to actuate the rear brake mechanism to slow or stop the at least one of the rear wheels from rotating with respect to the frame extension.

9. The vehicle of claim 1 further including a front brake mechanism fixed between the front wheel and the steering fork.

10. The vehicle of claim 1 further including a rear brake mechanism fixed between at least one of the rear wheels and the extension frame.

11. The vehicle of claim 1 wherein the frame extension is generally U-shaped and includes two opposing ends, each end being fixed to the frame with one of two pivots.

12. The vehicle of claim 1 wherein the resilient suspension member is at least one spring shock absorber.

13. The vehicle of claim 1 wherein the resilient suspension member is at least one elastomeric cushion.

14. The vehicle of claim 1 wherein the seat further includes a handle projecting rearwardly therefrom, whereby the handle may be grasped and lifted to collapse the frame extension into the retracted configuration.

15. The vehicle of claim 1 wherein the at least one battery is disposed on a bottom side of the frame.

16. The vehicle of claim 1 further including an on/off switch with a key lock, whereby the key lock cannot be actuated without a key being inserted therein.

17. The vehicle of claim 1 wherein the seat includes a storage space.

18. The vehicle of claim 1 further including a safety chain selectively fixable between the frame extension and the frame when the frame extension is in the operating configuration to inhibit the frame extension from inadvertently retracting into the collapsed position during use.

* * * * *